United States Patent [19]

Inoue et al.

[11] Patent Number: 4,819,959
[45] Date of Patent: Apr. 11, 1989

[54] VEHICLE SUSPENSION SYSTEM

[75] Inventors: Hitoshi Inoue; Toshiro Kondo; Naoto Takata; Takeshi Edahiro, all of Hiroshima, Japan

[73] Assignee: Mazda Motor Corporation, Japan

[21] Appl. No.: 114,205

[22] Filed: Oct. 29, 1987

[30] Foreign Application Priority Data

Oct. 31, 1986 [JP] Japan .................. 61-261030

[51] Int. Cl.$^4$ ................................ B60G 3/20
[52] U.S. Cl. ..................... 280/660; 280/675
[58] Field of Search ............. 280/663, 666, 668, 690, 280/691, 696, 688, 660, 675

[56] References Cited

U.S. PATENT DOCUMENTS 4,145,072  3/1979  Matschinsky ............... 280/668
4,440,420  4/1984  Muller ...................... 280/691

FOREIGN PATENT DOCUMENTS 51-20765  6/1976  Japan .
52-9889   3/1977  Japan .
171604    8/1986  Japan ...................... 280/691
2172254   9/1986  United Kingdom ........ 280/691

Primary Examiner—Charles A. Marmor
Assistant Examiner—Ross Weaver
Attorney, Agent, or Firm—Gerald J. Ferguson, Jr.

[57] ABSTRACT

A wheel support rotatably supports a dirigible wheel. An upper wheel-support support member connects an upper portion of the wheel support to the vehicle body, and a lower wheel-support support member connects a lower portion of the wheel support to the vehicle body. The upper and lower wheel-support support members are arranged to respectively define upper and lower pivot points which define an imaginary kingpin axis. At least one of the upper and lower wheel-support support members is formed of a pair of separate link members one end of each of which is pivoted on the vehicle body at different portions of the vehicle body and the other end of each of which is rotatably connected to the wheel support at different portions of the wheel support. The upper and lower wheel-support support members are arranged so that the upper portion of the wheel support is displaced more inward than the lower portion thereof when the wheel makes a turn as the outer wheel, and so that the upper portion of the wheel support is displaced less inward than than the lowr portion thereof when the wheel makes a turn as the inner wheel.

17 Claims, 3 Drawing Sheets

VEHICLE SUSPENSION SYSTEM

BACKGROUND OF THE INVENTION

1. Field of the Invention

This invention relates to a vehicle suspension system, and more particularly to a vehicle suspension system for supporting dirigible wheels of a vehicle.

2. Description of the Prior Art

As the vehicle suspension system for supporting the dirigible wheels, there have been known a wishbone type suspension in which upper and lower ends of each wheel support member for supporting a dirigible wheel for rotation are connected to the vehicle body respectively by way of upper and lower arms extending in the transverse direction of the vehicle body, and a strut type suspension in which a strut is used for connecting the upper end of the wheel support member to the vehicle body in place of the upper arm in the wishbone type suspension. See Japanese Patent Publication No. 52(1977)-9889, for example.

The dirigible wheels supported by such a suspension system should be controlled, in order to increase the road gripping force and to improve the turning performance, so that the inner wheel has a positive camber and the outer wheel has a negative camber when they are making a turn. As a means for controlling the camber of the dirigible wheels during turning in the manner described above, there has been known an arrangement disclosed in Japanese Unexamined Patent Publication No. 58(1983)-67508 in which a pair of link members forming the upper arm are disposed so that the axis of symmetry thereof is set at an acute angle to the wheel axis and is positioned on the rear side of the wheel axis, and the imaginary kingpin axis (imaginary pivot axis) of the outer wheel is moved rearward to increase the caster angle so that the outer wheel has a negative camber.

However, the arrangement described above is disadvantageous in that it can be applied only to a wishbone type suspension system having an upper arm formed of a pair of link members and a lower arm formed of a so-called A-shaped arm Further, since the two link members must be disposed so that the axis of symmetry thereof is set at an acute angle to the wheel axis, one of the link members must be connected to the vehicle body at a substantially outer portion of the vehicle body. This makes it difficult to apply the arrangement to conventional vehicles, as they are.

Further, there have been disclosed in U.S. Pat. No. 4,440,420, and Japanese Patent Publication Nos. 51(1976)-20765 and 52(1977)-9889 suspension systems in which the wheel can be provided with a negative camber when it makes a turn as the outer wheel. However, in any one of the suspension systems, the wheel cannot be provided with a positive camber when it makes a turn as the inner wheel.

SUMMARY OF THE INVENTION

In view of the foregoing observations and description, the primary object of the present invention is to provide a vehicle suspension system for supporting a dirigible wheel of a vehicle in which the wheel can be provided with a negative camber when it makes a turn as the outer wheel and can be provided with a positive camber when it makes a turn as the inner wheel and which can be easily applied to conventional vehicles as they are.

In accordance with the present invention, there is provided a vehicle suspension system for supporting a dirigible wheel comprising a wheel support which rotatably supports the dirigible wheel, an upper wheel-support support member which connects an upper portion of the wheel support to the vehicle body, and a lower wheel-support support member which connects a lower portion of the wheel support to the vehicle body, the upper and lower wheel-support support members being arranged to respectively define upper and lower pivot points which define an imaginary kingpin axis, at least one of the upper and lower wheel-support support members comprising a pair of separate link members one end of each of which is pivoted on the vehicle body at different portions of the vehicle body and the other end of each of which is rotatably connected to the wheel support at different portions of the wheel support, characterized in that the upper and lower wheel-support support members are arranged so that the displacement in the transverse direction of the vehicle body of a point on the upper portion of the wheel support is larger, when the displacement toward the inner side of the vehicle body is assumed to be positive, than that of the point on the lower portion of the wheel support which is symmetrical to said point on the upper wheel-support support member with respect to the horizontal plane including the wheel center when the dirigible wheel on the wheel support makes a turn as the outer wheel in response to operation of the steering wheel, and the former displacement is smaller than the latter displacement when the dirigible wheel on the wheel support makes a turn as the inner wheel in response to operation of the steering wheel.

DESCRIPTION OF THE PREFERRED EMBODIMENTS

Figure 1:
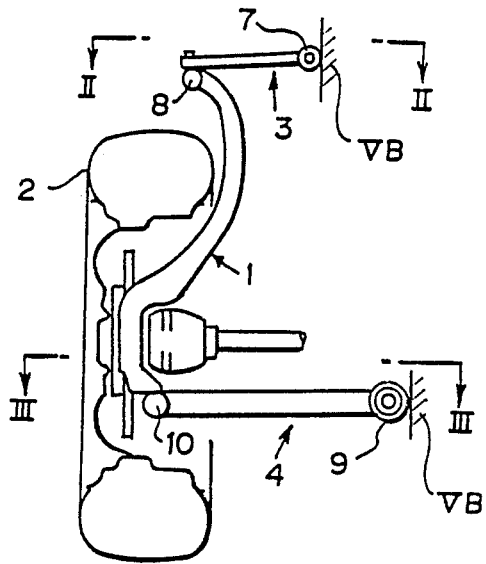
FIG. 1 is a front elevational view of a suspension system in accordance with an embodiment of the present invention.

In FIGS. 1 to 4 which show a wishbone type suspension in accordance with an embodiment of the present invention, a wheel support 1 for rotatably supporting a dirigible wheel 2 is connected to the vehicle body VB by way of an upper wheel-support support member (an upper arm 3 in this particular embodiment) which defines an upper one of the pivot points defining an imaginary kingpin axis (to be described later) and a lower wheel-support support member (a lower arm 4 in this particular embodiment) which defines a lower one or the other of the pivot points defining the imaginary kingpin axis.

The upper arm 3 comprises separate forward and rearward link members 5 and 6 which extend in the transverse direction of the vehicle body. One end of each of the link members 5 and 6 is pivotally mounted on the vehicle body VB by way of rubber bushings 7 at portions removed from each other in the longitudinal direction of the vehicle body VB, nd the other end of each of the link members 5 and 6 is connected for rotation to the upper end portion of the wheel support 1 by way of ball joints 8 at portions removed from each other in the longitudinal direction of the vehicle body VB. The lower arm 4 comprises a single bifurcated member (a so-called A-shaped arm) having an apex and a pair of legs. The ends of the legs of the lower arm 4 are pivotally mounted on the vehicle body VB by way of rubber bushings 9 at portions removed from each other in the longitudinal direction of the vehicle body, and the apex of the lower arm 4 is connected for rotation to the lower end portion of the wheel support 1 by way of a ball joint 10.

The wheel support 1 is provided with a rearwardly projecting knuckle arm portion 1a and the free end of the arm portion 1a is connected to one end of a tie rod 11. The other end of the tie rod 11 is pivotally connected to one end of a steering rack member 11a. When a steering force is transmitted to the wheel support member 1 by way of the tie rod 11 and the arm portion 1a of the wheel support 1, the dirigible wheel 2 is turned about the imaginary kingpin axis k which is the straight line passing through the intersection of the extensions of the axes of the link members 5 and 6, and the junction of the lower arm 4 to the wheel support 1, i.e., the ball joint 10.

Figure 5:
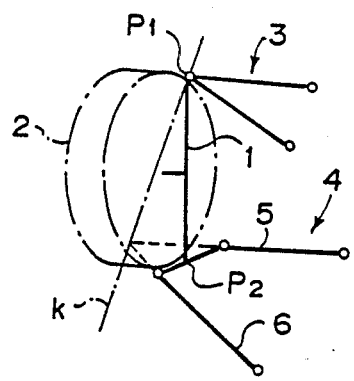
FIG. 5 is a view similar to FIG. 4 but showing another embodiment of the present invention.

In the embodiment described above, the upper wheel-support support member comprises the pair of link members 5 and 6, and the lower wheel-support support member comprises the A-shaped arm. However, the upper wheel-support support member 3 may comprise the A-shaped arm and the lower wheel-support support member 4 may comprise the pair of link members 5 and 6 as shown in FIG. 5. Further, both the upper and lower wheel-support support members may comprise the pair of link members 5 and 6 as shown in FIG. 6, and the upper wheel-support support member 3 may comprise a strut member 12 with the lower wheel-support support member comprising the pair of link members 5 and 6 as shown in FIG. 7.

In the embodiment shown in FIG. 5, the imaginary kingpin axis k is the straight line passing through the intersection of the extensions of the axes of the link members 5 and 6, and the ball joint 10.

Figure 6:
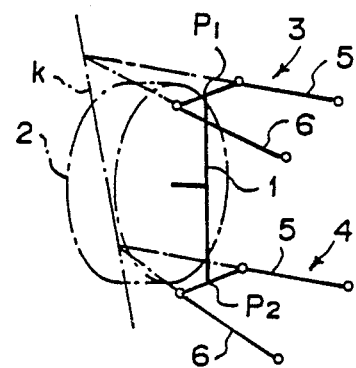
FIG. 6 is a view similar to FIG. 4 but showing still another embodiment of the present invention.

In the embodiment shown in FIG. 6, the imaginary kingpin axis k is the straight line passing through the intersection of the extensions of the axes of the lower pair of link members 5 and 6, and the intersection of the extensions of the axes of the upper pair of link members 5 and 6.

Figure 7:
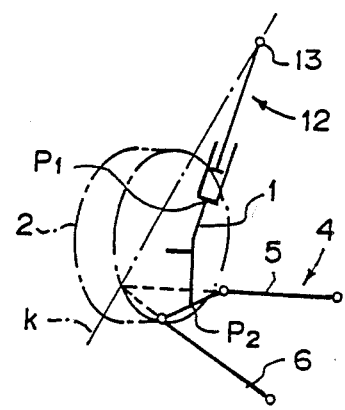
FIG. 7 is a view similar to FIG. 4 but showing still another embodiment of the present invention.

In the embodiment shown in FIG. 7, the lower wheel-support support member 4 comprises the link members 5 and 6 and the upper wheel-support support member 3 comprises the strut member 12 as described above. The strut member 12 is telescopic and is connected to the vehicle body at the upper end portion by way of a bearing 13 and to the upper end portion of the wheel support 1 at the lower end portion. In this embodiment, the imaginary kingpin axis k is the straight line passing through the center of the bearing 13 and the intersection of the extensions of the axes of the link members 5 and 6.

FIGS. 8(a) to 8(g) show various arrangements of the forward and rearward link members 5 and 6 divided according to the angles $\alpha$ and $\beta$ by which the link members 5 and 6 are inclined with respect to the transverse direction of the vehicle body as viewed in plan when the vehicle is running straight. It is assumed that the angles $\alpha$ and $\beta$ are positive when the link members 5 and 6 are inclined to diverge away from each other toward the inner side of the vehicle body (rightward in the figures) and are negative when the link members 5 and 6 are inclined to converge toward the inner side of the vehicle body. That is, it is assumed that the angle o is positive when the forward link member 5 is inclined forward (upward as seen in the figures) with respect to the transverse direction of the vehicle body, and it is assumed that the angle $\beta$ is positive when the rearward link member 6 is inclined rearward (downward as seen in the figures) with respect to the transverse direction of the vehicle body. In the arrangement shown in FIG. 8(a), the angle $\alpha$ is negative and the angle $\beta$ is positive ($\alpha<0<\beta$). In the arrangement shown in FIG. 8(b), the angle $\alpha$ is zero and the angle $\beta$ is positive ($\alpha=0<\beta$). In the arrangement shown in FIG. 8(c), the angles $\alpha$ and $\beta$ are both positive and the angle $\beta$ is larger than the angle $\alpha$ ($0<\alpha<\beta$). In the arrangement shown in FIG. 8(d), the angles $\alpha$ and $\beta$ are both positive and are equal to each other ($0<\alpha=\beta$). In the arrangement shown in FIG. 8(e), the angles $\alpha$ and $\beta$ are both positive and the angle $\alpha$ is larger than the angle $\beta$ ($0<\beta<\alpha$). In the arrangement shown in FIG. 8(f), the angle $\beta$ is zero and the angle $\alpha$ is positive ($\beta=0<\alpha$). In the arrangement shown in FIG. 8(g), the angle $\beta$ is negative and the angle $\alpha$ is positive ($\beta<0<\alpha$). Further, in FIGS. 8(a) to 8(g), the position of the link members 5 and 6 and the wheel support 1 when the vehicle is running straight is shown by the solid line, the position of the link members 5 and 6 and the wheel support 1 when the wheel makes a turn as the outer wheel is shown by the chain line, and the position of the link members 5 and 6 and the wheel support 1 when the wheel makes a turn as the inner wheel is shown by the dashed line.

Figure 4:
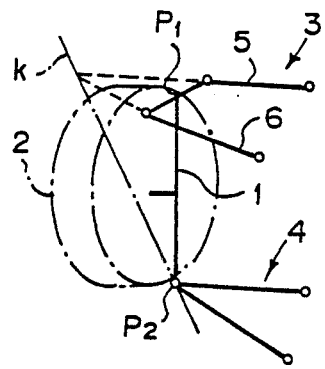
FIG. 4 is a schematic perspective view of the suspension system shown in FIG. 1.

In the embodiments described above, the upper wheel-support support member (the link members 5 and 6 in the case of the respective embodiments shown in FIGS. 4 and 6, the A-shaped arm in the case of the embodiment shown in FIG. 5, and the strut 12 in the case of the embodiment shown in FIG. 7) and the lower wheel-support support member (the A-shaped arm in the case of the embodiment shown in FIG. 4, and the link members 5 and 6 in the case of the respective embodiments shown in FIGS. 5 to 7) are arranged so that, when the dirigible wheel on the wheel support 1 makes a turn as the outer wheel in response to operation of the steering wheel, the displacement x in the transverse direction of the vehicle body of a point on the upper portion of the wheel support is larger (when the displacement toward the inner side of the vehicle body is assumed to be positive) than that y of the point on the lower portion of the wheel support which is symmetrical to the point on the upper wheel support with respect to the horizontal plane including the wheel center ($x-y>0$) at least at the beginning of the turn, and so that, when the dirigible wheel on the wheel support 1 makes a turn as the inner wheel in response to operation of the steering wheel, the former displacement is smaller than the latter displacement ($x-y<0$) at least at the beginning of the turn.

In FIGS. 4 to 7 and 8(a) to 8(g), points indicated at P1 and P2 are shown as typical points on the upper and lower wheel-support support members 3 and 4 which are symmetrical to each other with respect to the horizontal plane including the wheel center. In the embodiments shown in FIGS. 4 and 6, the point P1 is the middle point between the junctions of the link members 5 and 6 and the upper end portion of the wheel support 1, in the embodiment shown in FIG. 5, the point P1 is the junction of the A-shaped arm and the upper end portion of the wheel support 1, and in the embodiment shown in FIG. 7, the point P1 is the junction of the strut 12 and the upper end portion of the wheel support 1. The point P2 is the middle point between the junctions of the link members 5 and 6 and the lower end portion of the support wheel 1 in the embodiments shown in FIGS. 5 to 7, and the point P2 in the embodiment shown in FIG. 4 is the junction of the A-shaped arm and the lower end portion of the wheel support 1.

Figure 8:
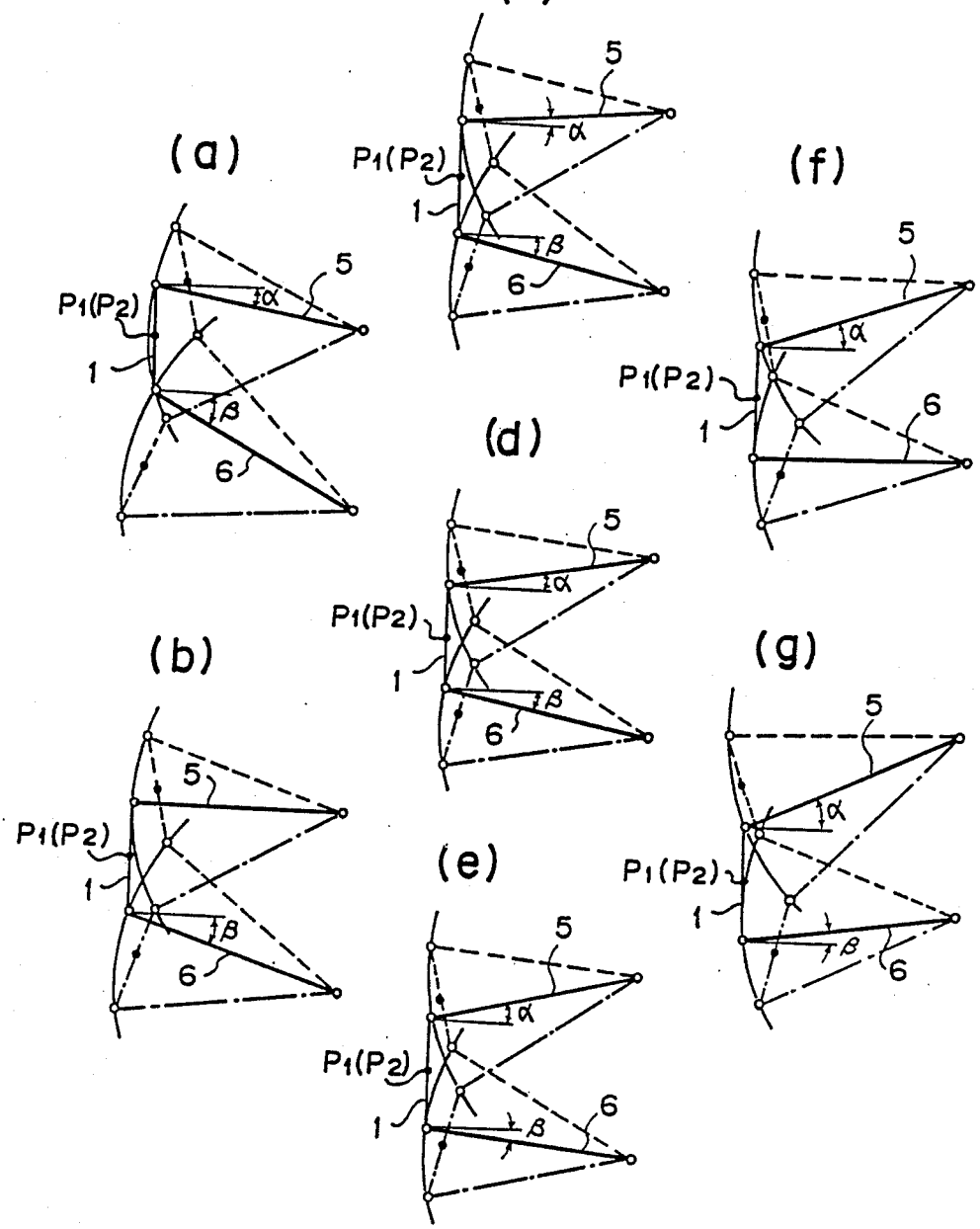
FIGS. 8(a) to 8(g) are schematic views showing various arrangement of the link members.

In order to satisfy the condition described above in the embodiment shown in FIGS. 1 to 4, the arrangement of the link members 5 and 6 must be one of those shown in FIGS. 8(e) to 8(g). In the case of the embodiments shown in FIGS. 5 and 7, the arrangement of the link members 5 and 6 must be one of those shown in FIGS. 8(a) to 8(c). In the case of the embodiment shown in FIG. 6, the combination of the arrangements of the upper and lower pairs of the link members 5 and 6 must be one of the following combinations:

(1) The arrangement of the upper pair of link members 5 and 6 is one of those shown in FIGS. 8(d) to 8(g), and the arrangement of the lower pair of link members 5 and 6 is one of those shown in FIGS. 8(a) to 8(c).

(2) The arrangement of the upper pair of link members 5 and 6 is one of those shown in FIGS. 8(e) to 8(g), and the arrangement of the lower pair of link members 5 and 6 is that shown in FIG. 8(d).

(3) The arrangement of the upper pair of link members 5 and 6 is that shown in FIG. 8(c), and the arrangement of the lower pair of link members 5 and 6 is that shown in FIG. 8(a).

(4) The arrangement of the upper pair of link members 5 and 6 is that shown in FIG. 8(g), and the arrangement of the lower pair of link members 5 and 6 is that shown in FIG. 8(e).

Figure 2:
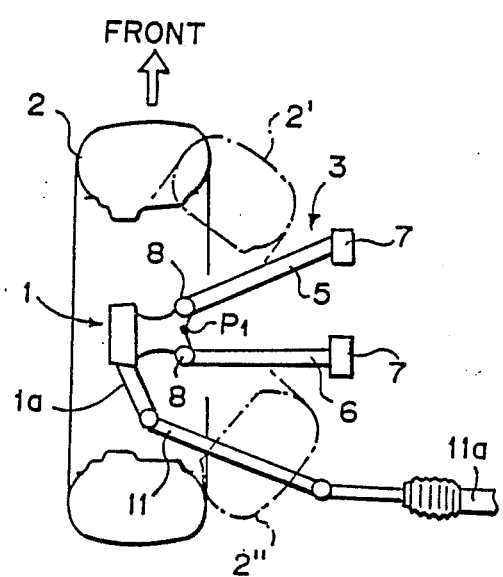
FIG. 2 is a cross-sectional view taken along line II—II in FIG. 1.
Figure 3:
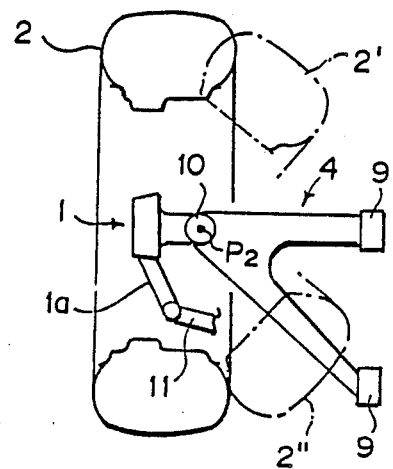
FIG. 3 is a cross-sectional view taken along line III-—III in FIG. 1.

In any one of the embodiments described above, when the wheel 2 is turned to make a turn as the outer wheel as indicated at 2' in FIGS. 2 and 3, the wheel support 1 which is swung in response to the turning of the wheel 2 is caused to tilt inward at the top to make negative the camber of the wheel 2 since the upper and lower wheel-support support member 3 and 4 are arranged so that the upper portion of the wheel support 1 is displaced more inward than the lower portion of 25 the same when the wheel makes a turn as the outer wheel as described above ($x-y>0$). On the other hand, when the wheel 2 is turned to make a turn as the inner wheel as indicated at 2" in FIGS. 2 and 3, the wheel support 1 is caused to tilt outward at the top to make positive the camber of the wheel 2 since the upper and lower wheel-support support member 3 and 4 are arranged so that the upper portion of the wheel support 1 is displaced less inward than the lower portion of the same when the wheel makes a turn as the inner wheel as described above ($x-y<0$).

As can be understood from the description above, the present invention can be applied to either a wishbone type or a strut type so long as at least one of the pivot points defining the imaginary kingpin axis k is formed by a pair of separate link members. Further, as can be understood from the description above, in accordance with the present invention, the link members 5 and 6 can be arranged relatively freely, and the junctions of the link members 5 and 6 and the vehicle body (the rubber bushings 7) need not be disposed at a substantially outer portion of the vehicle body. Accordingly the present invention can be applied to conventional vehicles, as they are.

Figure 9:
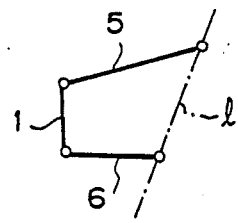
FIG. 9 is a schematic view showing a modification of the link members.

Though in the embodiments described above, the junctions of the link members 5 and 6 and the upper or lower end portion of the wheel support 1 are removed from each other solely in the longitudinal direction of the vehicle body so that the pivotal axis joining the junctions of the link members 5 and 6 to the vehicle body extends in the longitudinal direction of the vehicle body, the present invention can be applied to a suspension system in which the pivotal axis (indicated at l in FIG. 9) extends at an angle to the longitudinal direction of the vehicle body as shown in FIG. 9.

We claim:

1. A vehicle suspension system for supporting a dirigible wheel comprising a wheel support which rotatably supports the dirigible wheel, an upper wheel-support support member which connects an upper portion of the wheel support to the vehicle body, and a lower wheel-support support member which connects a lower portion of the wheel support to the vehicle body, the upper and lower wheel-support support members being arranged to respectively define upper and lower pivot points which define an imaginary kingpin axis, at least one of the upper and lower wheel-support support members comprising a pair of separate link members one end of each of which is pivoted on the vehicle body at different portions of the vehicle body and the other end of each of which is rotatably connected to the wheel support at different portions of the wheel support, characterized in that the upper and lower wheel-support support members are arranged so that a displacement in the transverse direction of the vehicle body of a point on the upper portion of the wheel support is larger, when displacement toward the inner side of the vehicle body is assumed to be positive, than that of a point on the lower portion of the wheel support which is symmetrical to said point on the upper portion of the wheel support with respect to a horizontal plane including the wheel center when the dirigible wheel on the wheel support makes a turn as an outer wheel in response to operation of the steering wheel, and the former displacement is smaller than the latter displacement when the dirigible wheel on the wheel support makes a turn as an inner wheel in response to operation of the steering wheel.

2. A vehicle suspension system as defined in claim 1 in which one of the upper and lower wheel-support support members comprises a pair of separate link members which extend substantially in the transverse direction of the vehicle body and one end of each of which is pivoted on the vehicle body at different portions of the vehicle body and the other end of each of which is rotatably connected to the wheel support at different portions of the wheel support, and the other comprises an arm member extending substantially in the transverse direction of the vehicle body.

3. A vehicle suspension system as defined in claim 2 in which said upper wheel-support support member comprises a pair of separate link members which extend substantially in the transverse direction of the vehicle body and one end of each of which is pivoted on the vehicle body at different portions of the vehicle body and the other end of each of which is rotatably connected to the wheel support at different portions of the wheel support.

4. A vehicle suspension system as defined in claim 3 in which said lower wheel-support support member comprises a single arm member one end of which is pivoted on the vehicle body at two different points and the other end of which is connected for rotation to the wheel support at a single point.

5. A vehicle suspension system as defined in claim 4 in which said single arm member is bifurcated and has an apex and a pair of legs, the ends of the legs being pivotally mounted on the vehicle body at different points and the apex being connected for rotation to the wheel support at a single point.

6. A vehicle suspension system as defined in claim 4 in which the portion at which one of said pair of link members is pivoted on the vehicle body is forwardly removed from the portion at which the other link member is pivoted on the same with the portion at which said one link member is connected to the wheel support being forwardly removed from the portion at which the other link member is connected to the same, and said one link member is inclined with respect to the transverse direction of the vehicle body by an angle larger than the angle by which the other link member is inclined with respect to the same as viewed in plan when the vehicle is running straight, it being assumed that said angles are positive when the link members are inclined to diverge away from each other toward an inner side of the vehicle body and are negative when the link members are inclined to converge toward an inner side of the vehicle body.

7. A vehicle suspension system as defined in claim 3 in which said arm member which forms said lower wheel-support support member also comprises a pair of separate link members which extend substantially in the transverse direction of the vehicle body and one end of each of which is pivoted on the vehicle body at different portions of the vehicle body and the other end of each of which is rotatably connected to the wheel support at different portions of the wheel support.

8. A vehicle suspension system as defined in claim 2 in which said lower wheel-support support member comprises a pair of separate link members which extend substantially in the transverse direction of the vehicle body and one end of each of which is pivoted on the vehicle body at different portions of the vehicle body and the other end of each of which is rotatably connected to the wheel support at different portions of the wheel support.

9. A vehicle suspension system as defined in claim 8 in which said upper wheel-support support member comprises a single arm member one end of which is pivoted on the vehicle body at two different points and the other end of which is connected for rotation to the wheel support at a single point.

10. A vehicle suspension system as defined in claim 9 in which the portion at which one of said pair of link members is pivoted on the vehicle body is forwardly removed from the portion at which the other link member is pivoted on the same with the portion at which said one link member is connected to the wheel support being forwardly removed from the portion at which the other link member is connected to the same, and said one link member is inclined with respect to the transverse direction of the vehicle body by an angle smaller than the angle by which the other link member is inclined with respect to the same as viewed in plan when the vehicle is running straight, it being assumed that said angles are positive when the link members are inclined to diverge away from each other toward an inner side of the vehicle body and are negative when the link members are inclined to converge toward an inner side of the vehicle body.

11. A vehicle suspension system as defined in claim 1 in which said upper wheel-support support member comprises a strut member which is fixed to the upper portion of the wheel support at its lower end and pivoted on the vehicle body at its upper end, and said lower wheel-support support member comprises a pair of separate link members which extend substantially in the transverse direction of the vehicle body and one end of each of which is pivoted on the vehicle body at different portions of the vehicle body and the other end of each of which is rotatably connected to the wheel support at different portions of the wheel support.

12. A vehicle suspension system as defined in claim 11 in which the portion at which one of said pair of link members is pivoted on the vehicle body is forwardly removed from the portion at which the other link member is pivoted on the same with the portion at which said one link member is connected to the wheel support being forwardly removed from the portion at which the other link member is connected to the same, and said one link member is inclined with respect to the transverse direction of the vehicle body by an angle smaller than the angle by which the other link member is inclined with respect to the same as viewed in plan when the vehicle is running straight, it being assumed that said angles are positive when the link members are inclined to diverge away from each other toward an inner side .of the vehicle body and are negative when the link members are inclined to converge toward an inner side of the vehicle body.

13. A vehicle suspension system for supporting a dirigible wheel comprising a wheel support which rotatably supports the dirigible wheel and is provided with a rearwardly extending knuckle arm portion connected to a steering force transmission member to drive the wheel support in response to operation of a steering wheel, an upper wheel-support support member which connects an upper portion of the wheel support to the vehicle body, and a lower wheel-support support member which connects a lower portion of the wheel support to the vehicle body, the upper and lower wheel-support support members being arranged to respectively define upper and lower pivot points which define an imaginary kingpin axis, the upper wheel-support support member comprising a pair of separate link members one end of each of which is pivoted on the vehicle body at different portions of the vehicle body and the other end of each of which is rotatably connected to the wheel support at different portions of the wheel support and the lower wheel-support support member comprising a bifurcated single arm member having an apex and a pair of legs, the ends of the legs being pivotally mounted on the vehicle body at different points and the apex being connected for rotation to the wheel support at a single point, characterized in that the upper and lower wheel-support support members are arranged so that displacement in the transverse direction of the vehicle body of a point on the upper portion of the wheel support is larger, when the displacement toward an inner side of the vehicle body is assumed to be positive, than that of a point on the lower portion of the wheel support which is symmetrical to said point on the upper portion of the wheel support with respect to a horizontal plane including the wheel center when the dirigible wheel on the wheel support makes a turn as an outer wheel in response to operation of the steering wheel, and the former displacement is smaller than the latter displacement when the dirigible wheel on the wheel support makes a turn as an inner wheel in response to operation of the steering wheel.

14. A vehicle suspension system as defined in claim 13 in which the portion at which one of said pair of link members is pivoted on the vehicle body is forwardly removed from the portion at which the other link member is pivoted on the same with the portion at which said one link member is connected to the wheel support being forwardly removed from the portion at which the other link member is connected to the same, and said one link member is inclined with respect to the transverse direction of the vehicle body by an angle larger than the angle by which the other link member is inclined with respect to the same as viewed in plan when the vehicle is running straight, it being assumed that said angles are positive when the link members are inclined to diverge away from each other toward an inner side of the vehicle body and are negative when the link members are inclined to converge toward an inner side of the vehicle body.

15. A vehicle suspension system for supporting a dirigible wheel comprising a wheel support which rotatably supports the dirigible wheel and is provided with a rearwardly extending knuckle arm portion connected to a steering force transmission member to drive the wheel support in response to operation of a steering wheel, an upper wheel-support support member which connects an upper portion of the wheel support to the vehicle body, and a lower wheel-support support member which connects a lower portion of the wheel support to the vehicle body, the upper ad lower wheel-support support members being arranged to respectively define upper and lower pivot points which define an imaginary kingpin axis, each of the upper and lower wheel-support support members comprising a pair of separate link members one end of each of which is pivoted on the vehicle body at different portions of the vehicle body and the other end of each of which is rotatably connected to the wheel support at different portions of the wheel support, characterized in that the upper and lower wheel-support support members are arranged so that displacement in the transverse direction of the vehicle body of a point on the upper portion of the wheel support is larger, when the displacement toward an inner side of the vehicle body is assumed to be positive, than that of a point on the lower portion of the wheel support which is symmetrical to said point on the upper portion of the wheel support with respect to a horizontal plane including the wheel center when the dirigible wheel on the wheel support makes a turn as an outer wheel in response to operation of the steering wheel, and the former displacement is smaller than the latter displacement when the dirigible wheel on the wheel support makes a turn as an inner wheel in response to operation of the steering wheel.

16. A vehicle suspension system for supporting a dirigible wheel comprising a wheel support which rotatably supports the dirigible wheel and is provided with a rearwardly extending knuckle arm portion connected to a steering force transmission member to drive the wheel support in response to operation of a steering wheel, an upper wheel-support support member which connects an upper portion of the wheel support to the vehicle body, and a lower wheel-support support member which connects a lower portion of the wheel support to the vehicle body, the upper and lower wheel-support support members being arranged to respectively define upper and lower pivot points which define an imaginary kingpin axis, said upper wheel-support support member comprising a strut member which is fixed to the upper portion of the wheel support at its lower end and pivoted on the vehicle body at its upper end, and said lower wheel-support support member comprising a pair of separate link members which extend substantially in the transverse direction of the vehicle body and one end of each of which is pivoted on the vehicle body at different portions of the vehicle body and the other end of each of which is rotatably connected to the wheel support at different portions of the wheel support characterized in that the upper and lower wheel-support support members are arranged so that displacement in the transverse direction of the vehicle body of a point on the upper portion of the wheel support is larger, when the displacement toward an inner side of the vehicle body is assumed to be positive, than that of the point on the lower portion of the wheel support which is symmetrical to said point on the upper portion of the wheel support with respect to a horizontal plane including the wheel center when the dirigible wheel on the wheel support makes a turn as an outer wheel in response to operation of the steering wheel, and the former displacement is smaller than the latter displacement when the dirigible wheel on the wheel support makes a turn as an inner wheel in response to operation of the steering wheel.

17. A vehicle suspension system as defined in claim 16 in which the portion at which one of said pair of link members is pivoted on the vehicle body is forwardly removed from the portion at which the other link member is pivoted on the same with the portion at which said one link member is connected to the wheel support being forwardly removed from the portion at which the other link member is connected to the same, and said one link member is inclined with respect to the transverse direction of the vehicle body by an angle smaller than the angle by which the other link member is inclined with respect to the same as viewed in plan when the vehicle is running straight, it being assumed that said angles are positive when the link members are inclined to diverge away from each other toward an inner side of the vehicle body and are negative when the link members are inclined to converge toward an inner side of the vehicle body.

* * * * *